Nov. 17, 1964  F. M. WIBERG  3,157,490
METHOD FOR REFINING OF METALS
Filed Oct. 23, 1961
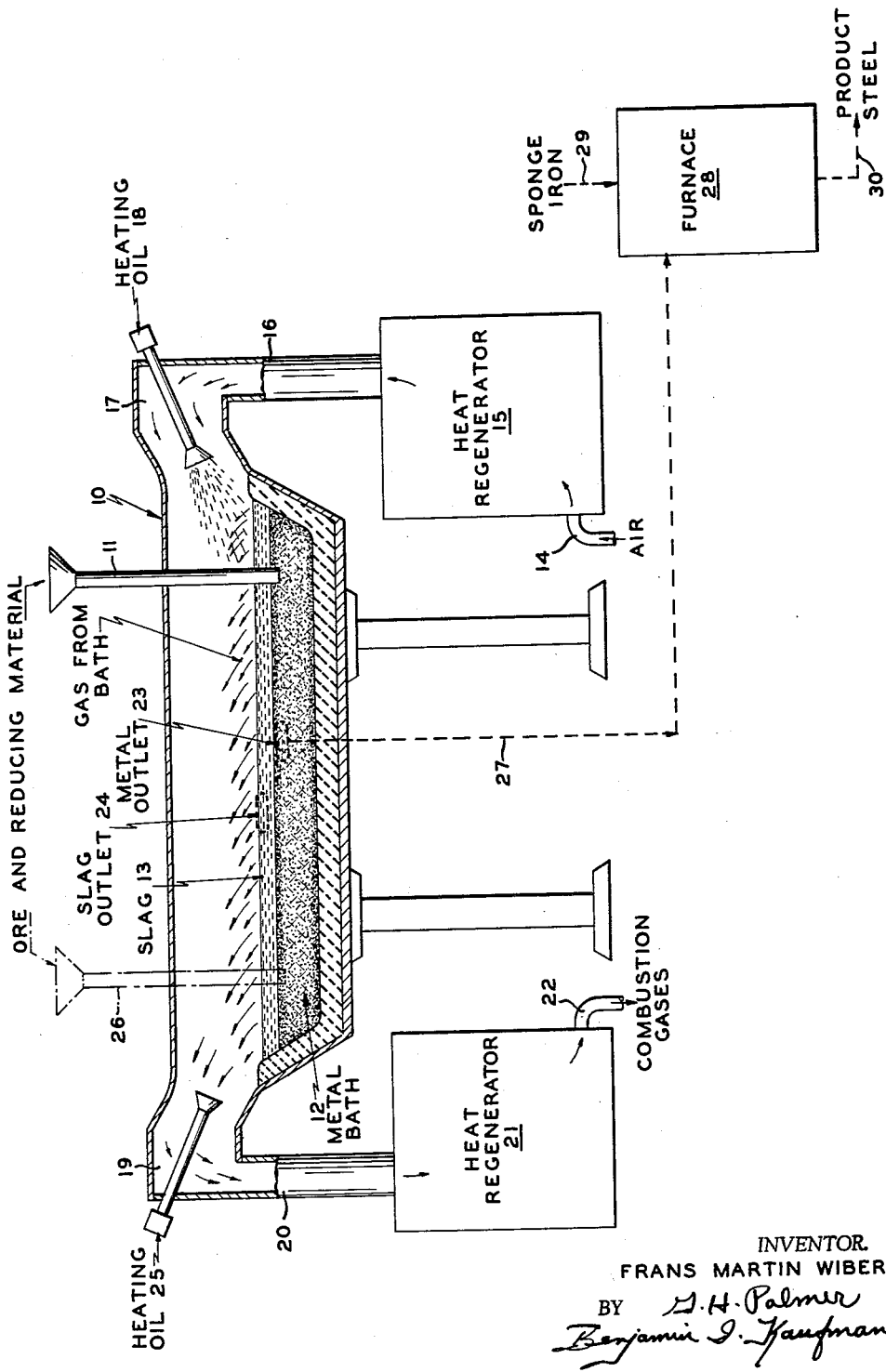
INVENTOR.
FRANS MARTIN WIBERG
BY G. H. Palmer
Benjamin J. Kaufman
ATTORNEYS

3,157,490
METHOD FOR REFINING OF METALS

Frans Martin Wiberg, Bromma, Sweden, assignor, by mesne assignments, to Pullman Incorporated, a corporation of Delaware
Filed Oct. 23, 1961, Ser. No. 146,934
15 Claims. (Cl. 75—40)

This invention relates to the refining of metals, and, more particularly, to the refining of metal oxides. In one of its more important aspects, the invention relates to an improved method for the direct reduction of metal ores, such as iron, chromium and manganese, or combinations thereof, and other oxides of such metals, with a reducing material to convert these compositions to their metallic states, with a relatively low carbon-content, and suitable for being charged to a reaction zone, where, in combination with low carbon-content sponge iron, low-carbon steel or alloys can be produced.

This application is a continuation-in-part of my prior and co-pending application Serial No. 55,854, filed September 14, 1960 (now abandoned), and also a continuation-in-part of my prior and co-pending application Serial No. 108,218, filed March 9, 1961.

Prior to the present invention, in processes heretofore proposed for the reduction of oxide ores, for example, in the production of molten pig iron or steel from pulverulent or finely ground iron ores, it was usually found to be first necessary to convert the ore to a lump form by sintering or briquetting processes. In other processes for the manufacture of steel, the pig iron, employed for this purpose, can be refined by the addition of iron ore in lump form. However, in this aspect, only a small portion of the steel recovered is derived from the added ore. In the production of pig iron, employing an electric furnace, it has been attempted to reduce finely divided granular iron ore with granular reducing agents deposited on the surface of the slag bath in the furnace. In this connection, however, serious operating difficulties have been encountered, and, furthermore, the carbon monoxide developed from the reduction operation can be utilized to only a limited extent. In still other proposed methods, pulverulent iron ore is injected, together with oxygen and powdered carbon or natural gas into the upper portion of the furnace, where a reducing flame of high temperature is maintained so that the ore is reduced to liquid drops of pig iron or steel, which can be collected in the lower portion of the furnace. These methods have, as a rule, exhibited poor heat economy, and, in addition, have entailed a high consumption of oxygen. Hence, prior to the present invention, no satisfactory method has been found in which pulverulent ores, e.g., iron oxides, can be converted directly into the metallic state (for example, into liquid pig iron, as in the case of iron ore), by means of carbonaceous solids, liquids or gaseous reducing agents, and which can, in the process, be burned completely with air to form carbon dioxide and/or steam, and in which neither oxygen nor electric heating is required to be employed. Furthermore, prior to the present invention, no satisfactory method has been proposed for reducing any of the aforementioned ores to their metallic state with a controlled, relatively low carbon-content so that in combination with relatively large quantities of low carbon-content sponge iron, low carbon-content steel or alloys can be produced.

It is, therefore, an object of the present invention to provide a novel method for producing iron-containing products having a relatively low carbon-content.

Another object of the invention is to provide a novel method for reducing metal oxides, such as iron, chromium or manganese-containing ores, or combinations thereof, to their respective metals, having a relatively low carbon-content and which, in combination with sponge iron, can result in the production of low-carbon steel or alloys.

A further object of the invention is to provide a novel method for reducing metal oxides, such as iron, chromium or manganese-containing ores, or combinations thereof, to their respective metals, having a relatively low carbon-content, and which, in combination with sponge iron, can result in the production of low-carbon steel or alloys in a high degree of conversion and at a high rate.

Other objects and advantages inherent in the invention will become apparent to those skilled in the art from the following description and the accompanying drawing.

In accordance with the general process of the invention as more fully hereinafter described, there is provided an improved process for the production of iron-containing products, having a low carbon-content, such as steel or alloys, by the steps which include providing a molten metal bath, then introducing a reducing material directly into this bath to be absorbed by the metal of the bath, introducing a material comprising a metal oxide or the ore in a granular form into and below the surface of the bath to be reduced by the reducing material in the bath, and recovering the reduced material from the bath. This recovered reduced material is then passed into a reaction zone such as an electric or open-hearth furnace. This zone is provided with molten iron derived from sponge iron. The reduced material, separated from the aforementioned bath, and the molten sponge iron present in the reaction zone are then intermixed, under the conditions more fully hereinafter described, to produce the iron-containing product of desired composition, and of the desired carbon-content, as a product of the process. In this respect, it will be noted that the reducing material and the metal oxide may be introduced into the molten metal bath, either separately or in admixture. The molten iron, derived from sponge iron, which is present in the reaction zone, may be introduced, either in the molten state or may be introduced in the form of sponge iron lumps, subsequently to be melted within the reaction zone for intermixing with the introduced reduced material from the bath, to produce the desired iron-containing product.

More specifically, in accordance with the aforementioned general process of the present invention, employing iron ore as representative of the other metal oxides or ores, for example, those containing other metals such as chromium or manganese, there is provided a vessel or furnace containing a molten bath of iron or steel, and which is maintained in this molten state throughout the reduction stage. Into this molten metal bath, granular iron ore (or other metal oxides to be reduced) is injected below the surface of the bath, and which is also below the layer of the slag that may exist upon the surface of the molten metal bath, employing, for this purpose, a lance, pipe or other transferring means. The granular ore may be introduced into the bath in either a cold or preheated condition. The transfer of the ore through the lance into the bath may be effected in the form of a gravity feed or, if so desired, it may be forced into the bath through the use of an inert gas, such as nitrogen, an oxidizing gas, such as air, or a reducing gas, such as natural gas. The reducing material employed in the process is a solid, liquid or gaseous reducing agent, which is capable of exerting a carburizing action on the molten metal bath. This reducing agent may, therefore, comprise such materials as powdered coke, coal, oil or natural gas, and, as previously indicated, may be introduced into the molten bath either separately or in admixture with the ore or metal oxide to be reduced. If so desired, a slag-forming and/or desulfurizing material may also be introduced into the molten metal bath in addition to the reducing material. In order to supply heat to the molten metal bath, various fuels, for example, oils or gases, may be combused. The hot gaseous products produced by this combustion may then be employed to preheat an oxygen-containing gas, such as air or pure oxygen, and then returning the preheated gas to the bath for the combustion of combustible gases that are liberated from the bath during the reduction reaction.

In a preferred modification of the process of the present invention, the reduction treatment is carried out in an elongated furnace chamber containing the molten metal bath. The injection of the granular metal oxide or ore (together with the reducing material and also a carrier gas, if so desired) into the molten metal bath is effected alternately in the vicinity of each end of the elongated furnace chamber containing the molten metal bath. This injection is made to take place at the same time that an oxygen-containing gas, such as air preheated to a high temperature, is fed to the same end of the furnace chamber at which the injection of the granular metal oxide and the reducing material into the molten bath, takes place. Air, preheated for this purpose, is obtained from either of two alternating regenerator chambers or regenerative heat exchangers, located at and in open communication with the respective ends of the furnace chamber. The preheated air thus introduced alternately into the respective ends of the furnace chamber, results in the combustion of carbon-monoxide gases, discharging from the surface of the molten metal bath, taking place. At this point, it should be noted that, if so desired, additional fuel and/or oxygen may be fed into the same end of the furnace chamber, so that the resulting flame produced can impart to the molten metal bath the necessary quantity of heat required for carrying out the reduction treatment. The hot gases resulting from the combustion, are conducted to the other end of the furnace chamber to its corresponding regenerator chamber where they impart heat to the walls of this chamber. Then, following the reversal of direction of the movement of the flame, the heat imparted to the regenerator chamber is employed for preheating further quantities of the combustion air.

As indicated above, the injection of the granular metal oxide and the reducing material into the molten metal bath is effected by means of one or more tubes or lances. These lances can be directly introduced into the bath, and obliquely downward through openings in the side walls or end walls of the furnace chamber; or they may be introduced vertically through the furnace dome, if so desired. These lances can be water-cooled in the same manner as when oxygen is injected into molten steel in open-hearth furnaces.

It should be noted also that the furnace chamber can be so constructed that it is turnable about its longitudinal axis. In such instances, the injection of the metal oxide or granular material, and the reducing material is effected through lances passing through holes in the furnace wall, when the holes are in such position that they are above the surface of the bath. Metal can then be discharged from the furnace when the holes are below the surface of the bath.

As indicated above, the metal oxide or granular material can be blown into the bath in the furnace chamber together with the reducing material and/or the slag-forming materials through the same lance. However, it should be noted that the ore and the reducing material may be blown into the bath separately, if so desired. This choice will usually be determined by the quantity of combustible gas developed by the reaction of the iron ore with the carbon in the molten metal bath. If the reducing material which is employed is one which dissolves in the bath without substantial liberation of combustible gas where, for example, coke is employed as the reducing material, the reducing material can be blown into the center of the furnace chamber, into the molten bath or at the end opposite to that in which the granular metal oxide is introduced. If, on the other hand, the reducing agent employed develops large quantities of combustible gas (for example, where the reducing material comprises anthracite, oil or natural gas), it is more advantageous to inject it into the same end of the furnace chamber where the granular metal oxide is introduced, i.e., into the end of the furnace chamber where the combustion air enters, so that the gases developed will be combusted and impart their heat to the bath before leaving the furnace chamber.

As indicated above, the reduced material is removed from the bath and is passed to a suitable reaction zone, for example, an electric or open-hearth furnace. This reaction zone is provided with molten iron derived from sponge iron. This molten iron derived from sponge iron may be introduced into the reaction zone either in the molten state, as such, or in the form of sponge-iron lumps. If it is introduced into the reaction zone in the form of lumps, the latter are first melted in the zone for intermixing with the introduced reduced material from the bath to produce the desired iron-containing product. The term "sponge iron" refers to an industrially known reduced iron-containing material in the form of porous solids. Such spongy products may be obtained by the conventional methods which comprise conducting of an operation by either admixing the raw iron with coal or coke, or by passing a reducing gas in contact with a bed of iron ore in contact with a mixed bed of iron ore and solid reducing agents. Also, the sponge iron employed for this purpose may be that which is produced by the processes described in any of the co-pending applications of Charles K. Mader, Serial No. 67,220, filed November 4, 1960, or Serial No. 112,260, filed May 24, 1961, or Serial No. 133,095, filed August 22, 1961.

In order to produce the desired iron-containing product, the aforementioned mixture comprising reduced material from the bath and iron derived from sponge iron, is heated in the reaction zone or furnace to a temperature between about 1550° C. and about 1800° C., preferably at a temperature between about 1600° C. and about 1700° C. If the sponge iron is to be introduced into the furnace in a molten condition for intermixing with the reduced material from the bath, temperatures within the aforementioned temperature ranges may also be satisfactorily employed for the purpose of obtaining the sponge iron in a molten state.

In order to provide a better understanding of the improved process of the present invention, reference is had to the accompanying drawing which forms a part of this specification, and as a specific example, and illustrates diagrammatically one form of the apparatus employed and capable of carrying out a preferred embodiment of the invention. It should be understood, however, that it is not intended that the invention be limited to the embodiment or example as illustrated, but is capable of other embodiments which extend beyond the scope of the apparatus illustrated. Some of the mechanical elements necessary to effect the transfer of solids, liquids and vapors to maintain the necessary operating conditions to carry out the functions of the apparatus, have been omitted in order to simplify the description.

Referring to the drawing, a granular iron ore material, a reducing material, a fluxing material and air, as a conveying gas, is introduced into an open-hearth furnace 10 through a lance 11.

This feed material has the following composition.

Ore (magnetite concentrate):  Weight percent
$Fe_3O_4$ ---------------------------------- 87.1
$SiO_2$ ------------------------------------ 6.8
CaO -------------------------------------- 4.5
MgO -------------------------------------- 1.6
                                            ―――
                                            100.0

Coal (bituminous):
Carbon ----------------------------------- 75
Hydrogen --------------------------------- 5
Oxygen ----------------------------------- 8
Nitrogen --------------------------------- 1
Sulfur ----------------------------------- 1
Ash -------------------------------------- 10
                                            ―――
                                            100

Burnt lime:
CaO -------------------------------------- 85
$CaCO_3$ ---------------------------------- 10
$SiO_2$ ----------------------------------- 5
                                            ―――
                                            100

Compressed air (100 lbs. per sq. in. pressure): 20,000 cubic feet/hour (measured at atmospheric pressure).

The iron ore is introduced into lance 11 at the rate of 15.6 tons per hour. The coal is introduced at the rate of 1.75 tons per hour and the burnt lime at the rate of 1 ton per hour. The granular iron ore, the coal and lime are uniformly admixed and introduced at ambient temperatures and have a particle size of minus 50 mesh. The material introduced through lance 11 is passed directly to a point which is approximately 6 inches below the surface of the molten metal bath 12. This molten metal bath is previously prepared by the melting of a mixture comprising commercial pig iron, which comprises approximately 96% iron and 4% carbon, and also sand and burnt lime, which are introduced in equal proportions. The commercial pig iron employed in starting up the furnace is in an amount of approximately 10 tons, while the sand and burnt lime are each employed in an amount of approximately 200 pounds. The sand and burnt lime are placed into the furnace in order to provide the necessary slag upon the surface of the molten pig iron bath. This bath is maintained at a temperature of 2650° F. Slag produced during the reduction reaction has the following composition:

Weight percent
FeO -------------------------------------- 7.6
CaS -------------------------------------- 2.1
$SiO_2$ ----------------------------------- 36.2
CaO -------------------------------------- 41.3
MgO -------------------------------------- 6.8
$Al_2O_3$ --------------------------------- 6.0
                                            ―――
                                            100.0

The reduction reaction taking place within the molten metal bath involves the reaction of the reducing agent, i.e., coal, with the iron in the bath to form iron carbide, which dissolves in the bath. Thereafter, the iron oxide present in the granular raw ore reacts with iron carbide thus formed, to form iron and carbon monoxide. The iron is present in the form of its liquid state and the carbon monoxide is discharged as a gas up through the surface of the slag layer 13 at a rate of 120,000 cubic feet/hour, measured at atmospheric conditions. This gas comprises approximately, by volume, 58% carbon monoxide, 3% carbon dioxide, 23% hydrogen, 3% water and 13% nitrogen.

In order to make possible the combustion of the carbon monoxide and the hydrogen present in the aforementioned gases discharged through the slag layer 13, air is introduced through a conduit 14 into a heat regenerator 15, at the rate of 1,120,000 cubic feet/hour. In heat regenerator 15, air, introduced through conduit 14, is preheated to a temperature of approximately 2000° F. This heated air is conveyed through a duct 16 into the furnace-end 17, equipped with an oil burner 18. Through oil burner 18 heating oil is introduced at the rate of 3.5 tons per hour. A portion of the air introduced through conduit 14 is employed to combust the heating oil introduced through burner 18. The combustion of the heating oil and the air by burner 18 produces a flame, which travels across the surface of the bath and imparts heat to the furnace and its contents. That portion of the air introduced through conduit 14 which is not combusted by oil burner 18, is employed to combust the carbon monoxide and hydrogen components present in the gas discharged through the upper surface of the slag 13 in the furnace chamber.

The resulting combined combustion gases from the surface of the slag layer 13 in the furnace and oil burner 18 are then conveyed along the surface of the slag layer to the opposite furnace end 19. These gases are withdrawn at a temperature of approximately 2800° F. These gases are next conveyed through conduit 20 into corresponding heat regenerator 21 where they are cooled to a temperature of approximately 950° F. From heat regenerator 21 the cooled combustion gases are withdrawn through conduit 22 at the rate of 1,300,000 cubic feet per hour and discarded.

The molten metal bath 12 is so maintained that it is continuously overflowing through an outlet 23 located in the side of furnace-chamber 10, into a ladle or other suitable receptacle, and is referred to as the "hot metal" (or melted pig iron) having a composition of approximately 98.5% iron and 1.5% carbon and is withdrawn at the rate of approximately 10 tons per hour. The slag 13 is also withdrawn through a slag outlet 24, positioned at the side of furnace-chamber 10, and slightly higher than the metal bath outlet 23. This slag is withdrawn at the rate of approximately 3.75 tons per hour. It will be noted, in accordance with the embodiment described above, that the process is carried out by alternating the two heat regenerators 15 and 21 and their corresponding oil burners 18 and 25, and then conducting the reaction in a manner similar to that described above, and the feed material then being introduced through lance 26, at that time in the position shown.

The melted pig iron withdrawn through outlet 23, and containing approximately 1.5 percent carbon is next transferred, at the aforementioned rate of approximately 10 tons per hour, along the path indicated by line 27 to a conventional electric furnace 28. Into this furnace commercially available sponge iron containing approximately 0.1 percent carbon, is transferred along the path indicated by line 29, at the rate of 32 tons per hour. In furnace 28, the pig iron and sponge iron are intermixed and maintained at a temperature of 1650° C. Low carbon steel, containing approximately 0.4 percent carbon, is continuously withdrawn from furnace 28 along the path indicated by line 30, at the rate of 42 tons per hour.

The most important significance of the present invention resides in the advantages realized in the ability to reduce metal oxides to their metallic states, so that in combination with low-carbon-content, low carbon-content sponge iron (viz., less than about one-half percent), low carbon content steel or alloys can be produced.

It should also be noted, however, that it is also within the scope of the present process to produce such iron-containing products which are not usually classified as low-carbon-content materials, i.e. iron containing products which contain more than about one-half percent carbon. This can be effected by either employing liquid material from the aforementioned bath which contains increased quantities of carbon (by reason of increased quantities of the reducing agent employed), or by using sponge iron having an increased carbon-content, or by employing increased quantities of liquid material from the bath with respect to the quantity of sponge iron employed to be combined therewith in the furnace. It will be noted, with respect to the process of the present invention that if the iron ore, which is introduced into the bath, is relatively rich in iron-content, for example, above 65 percent, the quantity of slag produced per ton of iron is so small that the loss of iron in the slag becomes relatively unimportant, even if the FeO content of the slag becomes appreciable. Furthermore, if the iron ore, as well as the reducing agent employed, have a relatively low sulfur-content, the removal of the latter in the production of the iron presents no serious problem. It will also be noted that the use of the liquid iron in the electric arc furnace, facilitates the melting of the sponge iron. Also, the carbon present in the liquid iron obtained from the aforementioned bath may also function in further reduction of the unreduced sponge iron, if this sponge iron has not be previously completely reduced. In this manner, the present invention makes it possible to employ incompletely reduced sponge iron, which can be produced from sponge iron plants, if complete reduction is no longer a criterion.

Apart from the above, as further illustration and exemplification of the improved process of the present invention employing the apparatus and procedure described above, it should be noted that other metal oxides or ores in granular form, such as chromium or manganese ores, may be substituted in place of iron ores, and treated in a similar manner to liberate the free metal components for subsequent intermixing with sponge iron to produce products of desired composition. It should also be noted that while a particular embodiment of the improved process of the present invention has been described for purpose of illustration, various modifications and adaptations thereof, which will be obvious to those skilled in the art may be made within the spirit of the invention and without departing from its scope.

I claim:

1. A method for producing an iron-containing product which comprises providing a molten ferrous metal bath, introducing carbonaceous reducing material below the surface of said bath to carburize the metal of said bath and simultaneously introducing a material comprising discrete granules of a metal oxide below the surface of said bath as a confined stream so that said materials are first contacted with said molten metal below the surface of said bath and said granules are reduced therein, withdrawing reduced material from said bath having a relatively high carbon content and passing said reduced material to a reaction zone, providing in said zone a molten iron derived from sponge iron having a low carbon content relative to said reduced material and intermixing said constituents in said zone under an elevated temperature to produce an iron-containing product of desired composition.

2. The method of claim 1 in which the metal oxide comprises at least one material selected from the group consisting of iron, chromium and manganese.

3. The method of claim 1 in which the metal oxide comprises iron.

4. The method of claim 1 in which the metal oxide comprises chromium.

5. The method of claim 1 in which the metal oxide comprises manganese.

6. A method for producing an iron-containing product which comprises providing a molten ferrous metal bath, introducing carbonaceous reducing material below the surface of said bath to carburize the metal of said bath and simultaneously introducing a material comprising discrete granules of a metal oxide below the surface of said bath to react with the carburized metal and to be reduced thereby as a confined stream so that said materials are first contacted with the molten metal below the surface of said bath, withdrawing reduced material from said bath having a relatively high carbon content and passing reduced material from said bath to a reaction zone, providing in said zone a molten iron derived from sponge iron having a low carbon content relative to said reduced material from said bath, and intermixing under an elevated temperature said constituents in said zone to produce an iron-containing product of desired composition.

7. A method for producing an iron-containing product which comprises providing a molten ferrous metal bath, simultaneously introducing below the surface of said bath as a confined stream material comprising discrete granules of a metal oxide and a reducing material so that said material is first contacted with said molten metal below the surface of said bath, said reducing material being absorbed by the metal of said bath and said metal oxide being reduced by the reducing material in said bath, withdrawing reduced material from said bath having a relatively high carbon content and passing reduced material from said bath to a reaction zone, providing in said zone a molten iron derived from sponge iron having a low carbon content relative to said reduced material from the bath, and intermixing under an elevated temperature said constituents in said zone to produce an iron-containing product of desired composition.

8. A method for producing an iron-containing product which comprises providing a molten ferrous metal bath, introducing carbonaceous reducing material below the surface of said bath to be absorbed by the metal of said bath and simultaneously introducing a material comprising discrete granules of a metal oxide with a carrier gas below the surface of said bath to be reduced by the reducing material in said bath as a confined stream so that said materials are first contacted with said molten metal below the surface of said bath, withdrawing reduced material from said bath having a relatively high carbon content and passing reduced material from said bath to a reaction zone, providing in said zone a molten iron derived from sponge iron having a low carbon content relative to said reduced material, and intermixing said constituents under an elevated temperature in said zone to produce an iron-containing product of desired composition.

9. A method for producing an iron-containing product which comprises providing a molten ferrous metal bath, combusting a fuel to supply heat to said bath, introducing carbonaceous reducing material below the surface of said bath to be absorbed by the metal of said bath and simultaneously introducing a material comprising discrete granules of a metal oxide below the surface of said bath to be reduced by the reducing material in said bath as a confined stream so that said materials are first contacted with said molten metal below the surface of said bath, withdrawing reduced material from said bath having a relatively high carbon content and passing reduced material from said bath to a reaction zone, providing in said zone a molten iron derived from sponge iron having a low carbon content relative to said reduced material, and intermixing said constituents under an elevated temperature in said zone to produce an iron-containing product of desired composition.

10. A method for producing an iron-containing product which comprises providing a molten ferrous metal bath, combusting a fuel to supply heat to said bath, introducing carbonaceous reducing material below the surface of said bath to be absorbed by the metal of said bath and simultaneously introducing a material comprising discrete granules of a metal oxide below the surface of said bath to be reduced by the reducing material in said bath as a confined stream so that said materials are first contacted with said molten metal below the surface of said bath, withdrawing reduced material from said bath having a relatively high carbon content and passing said reduced material to a reaction zone, providing in said zone molten iron derived from sponge iron having a low carbon content relative to said reduced material withdrawn from the bath, intermixing said constituents in said zone to produce an iron-containing product of desired composition, employing hot gas produced by the aforementioned combustion of said fuel to preheat an oxygen-containing gas, and returning said thus preheated oxygen-containing gas to said bath for the combustion of combustible gases liberated from said bath.

11. A method for producing an iron-containing product which comprises providing a bath of a molten ferrous metal, introducing carbonaceous reducing material below the surface of said bath to carburize the metal of said bath and simultaneously introducing a material comprising discrete granules of an iron oxide below the surface of said bath as a confined stream so that said materials are first contacted with said molten metal below the surface of said bath to react with the carburized metal and to be reduced thereby, withdrawing reduced material from said bath having a relatively high carbon content and passing reduced material from said bath to a reaction zone, providing in said zone a molten iron derived from sponge iron having a low carbon content relative to said reduced material, and intermixing said constituents under an elevated temperature in said zone to produce an iron-containing product of desired composition.

12. A method for producing an iron-containing product which comprises providing a bath of a molten ferrous metal, introducing carbonaceous reducing material below the surface of said bath to carburize the metal of said bath and simultaneously introducing a material comprising discrete granules of an iron oxide below the surface of said bath as a confined stream so that said materials are first contacted with said molten metal below the surface of said bath to react with the carburized metal and to be reduced thereby, withdrawing reduced material from said bath having a relatively high carbon content and passing reduced material from said bath to a reaction zone, providing in said zone a molten iron derived from sponge iron having a low carbon content relative to said reduced material, and intermixing said constituents in said zone at a temperature between about 1550° C. and about 1800° C. to produce an iron-containing product of desired composition.

13. A method for producing an iron-containing product which comprises providing a bath of a molten ferrous metal, introducing carbonaceous reducing material below the surface of said bath to carburize the metal of said bath and simultaneously introducing a material comprising discrete granules of an iron oxide below the surface of said bath as a confined stream so that said materials are first contacted with said molten metal below the surface of said bath to react with the carburized metal and to be reduced thereby, withdrawing reduced material from said bath having a relatively high carbon content and passing reduced material from said bath to a reaction zone, providing in said zone a molten iron derived from sponge iron having a low carbon content relative to said reduced material, and intermixing said constituents in said zone at a temperature between about 1600° C. and about 1700° C. to produce an iron-containing product of desired composition.

14. A method for producing an iron-containing product which comprises providing a molten ferrous metal bath, combusting a fuel to supply heat to said bath, introducing carbonaceous reducing material below the surface of said bath to be absorbed by the metal of said bath and simultaneously introducing a material comprising discrete granules of a metal oxide below the surface of said bath as a confined stream so that said materials are first contacted with said molten metal below the surface of said bath to be reduced by the reducing material in said bath, withdrawing reduced material from said bath having a relatively high carbon content and passing said reduced material to a reaction zone, providing in said zone molten iron derived from sponge iron having a low carbon content relative to said reduced material, intermixing said constituents in said zone at a temperature between about 1550° C. and about 1800° C. to produce an iron-containing product of desired composition, employing hot gas produced by the aforementioned combustion of said fuel to preheat an oxygen-containing gas, and returning said thus preheated oxygen-containing gas to said bath for the combustion of combustible gases liberated from said bath.

15. A method for producing an iron-containing product which comprises providing a molten ferrous metal bath, combusting a fuel to supply heat to said bath, introducing reducing material below the surface of said bath to be absorbed by the metal of said bath and simultaneously introducing a material comprising discrete granules of a metal oxide below the surface of said bath as a confined stream so that said materials are first contacted with said molten metal below the surface of said bath to be reduced by the reducing material in said bath, withdrawing reduced material from said bath having a relatively high carbon content and passing said reduced material to a reaction zone, providing in said zone molten iron derived from sponge iron having a low carbon content relative to said reduced material, intermixing said constituents in said zone at a temperature between about 1600° C. and about 1700° C. to produce an iron-containing product of desired composition, employing hot gas produced by the aforementioned combustion of said fuel to preheat an oxygen-containing gas, and returning said thus preheated oxygen-containing gas to said bath for the combustion of combustible gases liberated from said bath.

References Cited in the file of this patent

UNITED STATES PATENTS

| | | |
|---|---|---|
| 453,227 | Wilson | June 2, 1891 |
| 608,779 | Karyscheff | Aug. 9, 1898 |
| 828,583 | Thiel | Aug. 14, 1906 |
| 1,255,191 | McDonald | Feb. 5, 1918 |
| 1,313,309 | Mambourg | Aug. 19, 1919 |
| 1,320,483 | Lund | Nov. 4, 1919 |
| 1,927,240 | Lofquist | Sept. 19, 1933 |
| 1,939,874 | Brassert | Dec. 19, 1933 |
| 2,320,206 | Engel et al. | May 25, 1943 |
| 2,593,505 | Wagstoff | Apr. 22, 1952 |
| 2,740,710 | Johannsen | Apr. 3, 1956 |
| 2,756,137 | Kocks | July 24, 1956 |

UNITED STATES PATENT OFFICE
CERTIFICATE OF CORRECTION

Patent No. 3,157,490              November 17, 1964

Frans Martin Wiberg

It is hereby certified that error appears in the above numbered patent requiring correction and that the said Letters Patent should read as corrected below.

Column 3, line 21, for "combused" read -- combusted --; column 4, line 50, after "Mader" insert -- and Juan Celada --; column 10, line 63, for "Wagstoff" read -- Wagstaff --.

Signed and sealed this 13th day of April 1965.

(SEAL)
Attest:

ERNEST W. SWIDER
Attesting Officer

EDWARD J. BRENNER
Commissioner of Patents